(12) United States Patent
Koziol (10) Patent No.: US 10,059,352 B2
(45) Date of Patent: Aug. 28, 2018

(54) CORRECTIVE DEVICE FOR UNEVEN BRAKE SHOE WEAR

(71) Applicant: WABTEC Holding Corp., Wilmerding, PA (US)

(72) Inventor: Michael Koziol, Berwyn, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/300,414

(22) Filed: Jun. 10, 2014

(65) Prior Publication Data

US 2015/0014102 A1    Jan. 15, 2015

Related U.S. Application Data

(60) Provisional application No. 61/833,077, filed on Jun. 10, 2013.

(51) Int. Cl.
| | |
|---|---|
| *B61H 13/00* | (2006.01) |
| *B61H 1/00* | (2006.01) |
| *B61H 13/24* | (2006.01) |
| *F16D 66/00* | (2006.01) |

(52) U.S. Cl.
CPC .............. *B61H 1/00* (2013.01); *B61H 13/24* (2013.01); *F16D 66/00* (2013.01)

(58) Field of Classification Search
CPC ........ B61H 13/24; B61H 13/34; B61H 13/36; B61H 13/38; B61H 15/0028; B61H 15/0057; B61H 15/0085
USPC .................... 188/200, 225.8, 229.1, 233.3
See application file for complete search history.

(56) References Cited

U.S. PATENT DOCUMENTS

| | | | | |
|---|---|---|---|---|
| 1,837,473 A | * | 12/1931 | Neveu ............... | B61H 15/0028 188/196 C |
| 1,969,923 A | * | 8/1934 | Carothers ............. | B61H 13/36 188/210 |
| 1,976,694 A | * | 10/1934 | Anderson ............. | B61H 13/36 188/210 |
| 2,105,995 A | * | 1/1938 | Busse .................... | B61H 13/36 188/210 |
| 2,105,998 A | * | 1/1938 | Cottrell ................. | B61H 13/36 188/210 |

(Continued)

FOREIGN PATENT DOCUMENTS

| | | |
|---|---|---|
| CN | 1102808 A | 5/1995 |
| CN | 101511660 A | 8/2009 |

(Continued)

*Primary Examiner* — Bradley T King
*Assistant Examiner* — Stephen M Bowes
(74) *Attorney, Agent, or Firm* — The Webb Law Firm (57) ABSTRACT

A corrective device for correcting uneven brake shoe wear on a brake mechanism for a railway vehicle, wherein the railway vehicle includes a brake beam having a tension beam coupled to a compression beam, a brake head with brake shoes provided at each end of the brake beams, and a slack adjuster. The corrective device is configured to cooperate with at least one of the compression beam and the slack adjuster to minimize or prevent the compression beam and the tension beam from rotating relative to the wheels and side frames of the railway vehicle. A braking system including the corrective device and a method for correcting uneven brake shoe wear on a brake mechanism for a railway vehicle is also provided.

17 Claims, 6 Drawing Sheets

(56) References Cited

U.S. PATENT DOCUMENTS

| | | | | |
|---|---|---|---|---|
| 2,108,967 A | * | 2/1938 | Isaacson | B61H 13/36 188/210 |
| 2,167,712 A | * | 8/1939 | Fine | B61H 13/36 188/210 |
| 2,184,690 A | * | 12/1939 | Varga | B61H 13/36 188/210 |
| 3,092,213 A | * | 6/1963 | Nelson | B61H 13/34 188/210 |
| 3,595,348 A | * | 7/1971 | Kyllonen | B61H 13/24 188/203 |
| 3,703,225 A | * | 11/1972 | Spaeth | B61H 13/34 188/207 |
| 3,731,766 A | * | 5/1973 | Campbell | B61H 13/24 188/202 |
| 3,737,012 A | * | 6/1973 | Haydu | B61H 13/24 188/196 D |
| 4,079,818 A | * | 3/1978 | Chierici | B61H 1/00 105/463.1 |
| 4,613,016 A | | 9/1986 | Hart et al. | |
| 5,339,930 A | | 8/1994 | Sich et al. | |
| 5,400,874 A | * | 3/1995 | Gayfer | B61H 13/24 188/197 |
| 5,456,337 A | | 10/1995 | Jackson | |
| 5,495,921 A | * | 3/1996 | Samulak | B61H 13/24 188/196 V |
| 6,155,389 A | | 12/2000 | Sandmann | |
| 6,364,068 B1 | | 4/2002 | Ring et al. | |
| 7,341,128 B2 | | 3/2008 | Ring et al. | |
| 7,416,262 B2 | | 8/2008 | Ring | |
| 7,802,662 B2 | | 9/2010 | Sommerfeld et al. | |
| 2008/0035432 A1 | | 2/2008 | Ring et al. | |
| 2011/0147140 A1 | | 6/2011 | Ring | |

FOREIGN PATENT DOCUMENTS

| | | |
|---|---|---|
| JP | 2002173027 A | 6/2002 |
| JP | 2008106853 A | 5/2008 |
| RU | 2248897 C2 | 11/2004 |

* cited by examiner

CORRECTIVE DEVICE FOR UNEVEN BRAKE SHOE WEAR

CROSS REFERENCE TO RELATED APPLICATIONS

This application claims priority to U.S. Provisional Patent Application No. 61/833,077 entitled "Corrective Device for Uneven Brake Shoe Wear", filed Jun. 10, 2013, which is hereby incorporated by reference in its entirety.

BACKGROUND OF THE INVENTION

Field of the Invention

The present disclosure is directed to a brake mechanism for a railway vehicle, and, further, to a device for correcting uneven brake shoe wear on the brakes of a railway vehicle.

Description of Related Art

Various brake mechanisms for railway vehicles are known in the art. In a truck-mounted brake mechanism, such as the TMX® or UBX® systems, owned by WABTEC Holding Corp., the Assignee of the present invention, two brake beams are provided per truck to provide the braking force to the two axles of the truck. The two brake beams are activated by at least one brake cylinder that is in fluid communication with a source of compressed air, such as an air reservoir mounted on the body of the railway vehicle.

In general, each brake beam includes a compression beam having its terminal ends coupled to the ends of a V-shaped tension beam. A brake head is provided at the opposing terminal ends of the compression beam and/or the V-shaped tension beam. Each brake head includes a brake shoe carrier adapted to receive a removable brake shoe. The brake mechanism is coupled to the truck of the railway vehicle at end portions of the brake heads. In operation, the brake beam having the compression beam and the V-shaped tension beam is suspended and contained within the railway truck bogie to allow movements with the truck.

During the braking operation, a non-uniform wear of the consumable material of the brake shoes may occur as the components of the brake mechanism wear toward their condemning limits. In such a scenario, the brake beams tend to rotate relative to side frames and the wheels, which forces an upper end of the brake shoes closer to the wheel relative to the lower end of the brake shoes. Such uneven contact of the brake shoes increases the wear rate of the upper end of the brake shoes relative to the lower end of the brake shoes. In certain situations, the uneven wear leaves the shoe material at the upper end of the brake shoe at the condemnable limit, while the shoe material at the lower end of the brake shoe is still serviceable. In extreme cases, the material of the brake shoe at the upper end may become so worn as to cause the metal backing plate of the brake shoe to be exposed and contact the wheel, thereby causing damage to the brake head, the backing plate, and the wheel. Another common problem is that, as the components of the brake mechanism gradually wear out, the compression beam may come into contact with a slack adjuster. During operation, continued contact between the compression beam and the slack adjuster may cause wear on the compression beam and/or the slack adjuster.

SUMMARY OF THE INVENTION

In view of the disadvantages of the existing brake mechanisms for railway vehicles, particularly truck-mounted brake beams, there is a need for an improved brake beam. In particular, there is a need for an improved brake beam that includes a corrective device to prevent uneven brake shoe wear. There is an additional need for an improved brake beam that includes a corrective device for preventing misalignment of the brake beam components as they gradually wear out.

In accordance with one embodiment, a corrective device for correcting uneven brake shoe wear on a brake mechanism for a railway vehicle is provided. The corrective device can be used on a railway vehicle, including a brake beam having a tension beam coupled to a compression beam, a brake head with brake shoes provided at each end of the brake beams, and a slack adjuster. One example of a braking system for which the corrective device can be used is a truck mounted braking system. The corrective device is configured to cooperate with at least one of the compression beam and the slack adjuster to minimize or prevent the compression beam and the tension beam from rotating relative to the side frames and wheels of the railway vehicle. The corrective device can be configured to cooperate with the compression beam to minimize or prevent movement of the compression beam toward the slack adjuster. According to one design, the corrective device can be positioned between the compression beam and the slack adjuster.

The corrective device includes at least one elongated body having an upper end separated from a lower end by a pair of sidewalls, at least one recess extending from the lower end toward the upper end of the at least one elongated body, and at least one securing element adapted for securing the at least one elongated body on the compression beam of the brake beam. According to one embodiment, the recess can be sized to fit on at least a portion of the compression beam of the brake beam. The at least one securing element can extend from at least one of the pair of sidewalls and can be angled inwards toward the at least one recess and deflect in an outward direction with respect to the at least one recess upon placement of the corrective device about the compression beam. According to one design, the at least one securing element can extend from one sidewall toward an opposing sidewall over at least a portion of a width of the recess.

The corrective device can be formed from a flexible material, such as rubber or any known elastomeric material. Alternatively, the corrective device can be formed from a rigid, self-lubricating material configured to deflect an amount sufficient enough to secure the corrective device to the compression beam.

In accordance with another embodiment, a braking system for a railway vehicle comprises a brake beam, including a tension beam coupled to a compression beam, a brake head with brake shoes provided at each end of the brake beam, a slack adjuster associated with the brake beam, and a corrective device configured to cooperate with at least one of the compression beam and the slack adjuster to minimize or prevent the compression beam and the tension beam from rotating relative to the side frames and wheels of the railway vehicle. According to one design, the braking system can be configured to be mounted to a truck of a railway vehicle and can include a pair of brake beams, wherein each of the brake beams include a tension beam coupled to a compression beam and the slack adjuster interconnects the pair of brake beams. The braking system can include a pair of corrective devices such that a corrective device cooperates with the compression beam of each of the pair of brake beams. The corrective device is configured to cooperate with the compression beam to minimize or prevent movement of the compression beam toward the slack adjuster.

The corrective device comprises at least one elongated body having an upper end separated from a lower end by a pair of sidewalls, at least one recess extending from the lower end toward the upper end of the at least one elongated body, and at least one securing element adapted for securing the at least one elongated body on the compression beam of the brake beam. The at least one securing element can extend from at least one of the pair of sidewalls and the securing element can be angled inwards toward the at least one recess and can deflect in an outward direction with respect to the at least one recess upon placement of the corrective device about the compression beam.

In accordance with another embodiment, a method for correcting uneven brake shoe wear on a brake mechanism for a railway vehicle, wherein the railway vehicle includes a brake beam having a tension beam coupled to a compression beam, a brake head with brake shoes provided at each end of the brake beams, and a slack adjuster, and wherein the method includes providing a corrective device and associating the corrective device with at least one of the compression beam and the slack adjuster to minimize or prevent the compression beam and the tension beam from rotating relative to the side frames and wheels of the railway vehicle. The corrective device can comprise at least one elongated body having an upper end separated from a lower end by a pair of sidewalls, at least one recess extending from the lower end toward the upper end of the at least one elongated body, and at least one securing element adapted for securing the at least one elongated body on the compression beam of the brake beam. The method includes positioning the corrective device about the compression beam at a location between the compression beam and the slack adjuster. According to one design, the at least one securing element extends from at least one of the pair of sidewalls and is angled inwards toward the at least one recess and deflects in an outward direction with respect to the at least one recess upon placement of the corrective device about the compression beam.

In accordance with one embodiment, a truck-mounted brake mechanism for a railway vehicle may have a brake beam with a tension beam coupled to a compression beam, and a brake head with brake shoes provided at each end of the brake beam. A device for correcting uneven brake shoe wear on the truck-mounted brake mechanism may include at least one elongated body having an upper end separated from a lower end by a pair of sidewalls. At least one recess may extend from the lower end toward the upper end of the at least one elongated body. The recess may be adapted to fit on at least a portion of the compression beam of the brake beam. The recess may include at least one securing element adapted for securing the at least one elongated body on the compression beam of the brake beam. The device may be adapted for aligning components of the truck-mounted brake mechanism to prevent uneven brake shoe wear.

These and other features and characteristics of the device for correcting uneven brake shoe wear on truck-mounted brakes of a railway vehicle, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to the drawings in which like reference characters refer to like parts throughout the several views thereof, the present disclosure is generally directed to a device for correcting uneven brake shoe wear on truck-mounted brakes of a railway vehicle.

Figure 1:
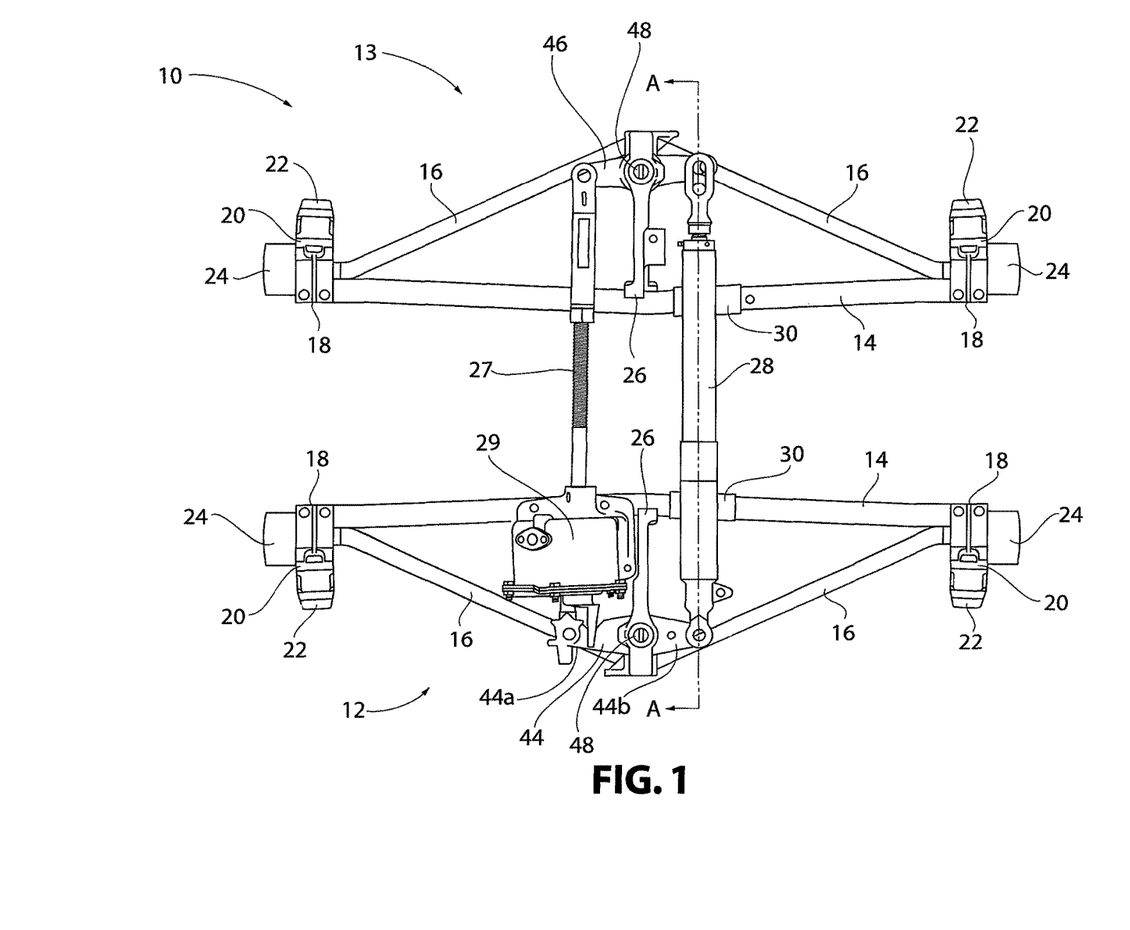
FIG. 1 is a top view of one brake beam of a truck-mounted brake mechanism in accordance with an embodiment of the present disclosure.
Figure 1A:
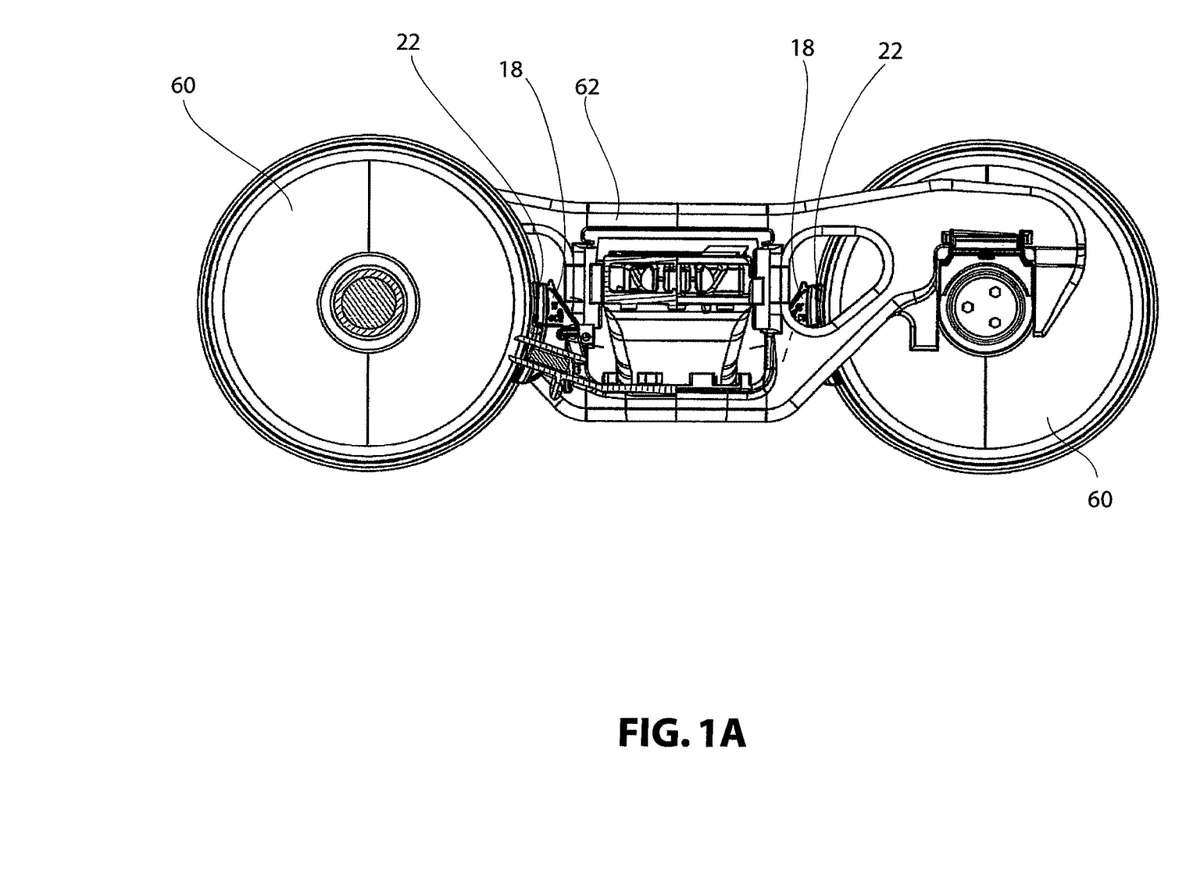
FIG. 1A is a side view of the truck-mounted brake mechanism of FIG. 1 installed within a truck in accordance with an embodiment of the present disclosure.
Figure 2:
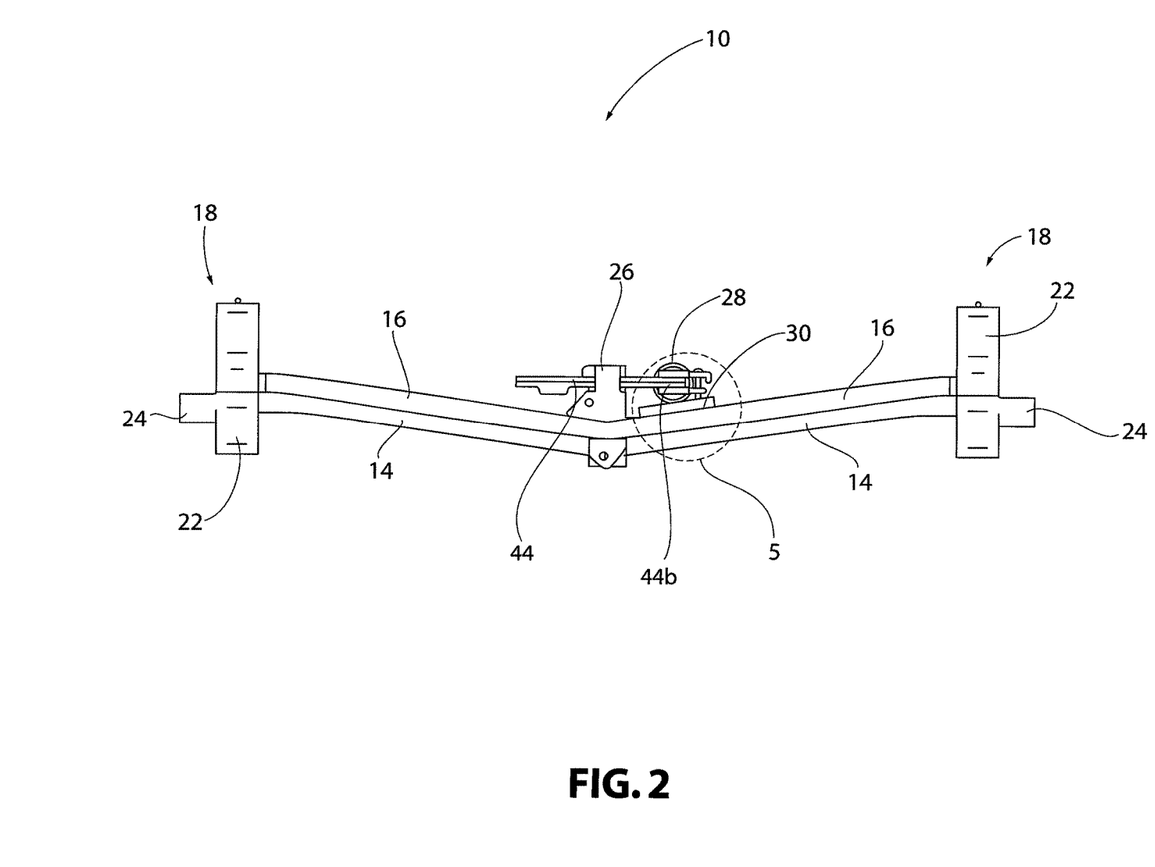
FIG. 2 is a front view of the brake beam shown in FIG. 1 in accordance with an embodiment of the present disclosure.

Referring initially to FIGS. 1, 1A and 2, a truck-mounted brake mechanism 10 is shown. The brake mechanism 10, as described herein, is intended for connection to a truck of a railway vehicle (not shown), as will be readily apparent to those skilled in the railway vehicle art. Examples of truck mounted braking systems include the TMX® or UBX® designs, owned by WABTEC Holding Corp., the assignee of the present invention. The brake mechanism 10 is adapted for use in railway vehicles adapted for passenger and/or cargo transit. However, this use is intended to be non-limiting and the brake mechanism 10 has applications in railway vehicles generally.

With continuing reference to FIGS. 1-2, the brake mechanism 10 includes a pair of brake beams, generally indicated as 12 and 13, which are substantially identical. Each of the brake beams 12, 13 include a compression beam 14, a generally V-shaped tension beam 16 and a strut 26. The terminal ends of the compression beam 14 are coupled to the corresponding terminal ends of the tension beam 16. At a location substantially midway between their opposite ends, the compression beam 14 and the tension beam 16 of the respective brake beams 12 are spaced apart sufficiently to allow connection of the strut 26 therebetween.

Figure 3:
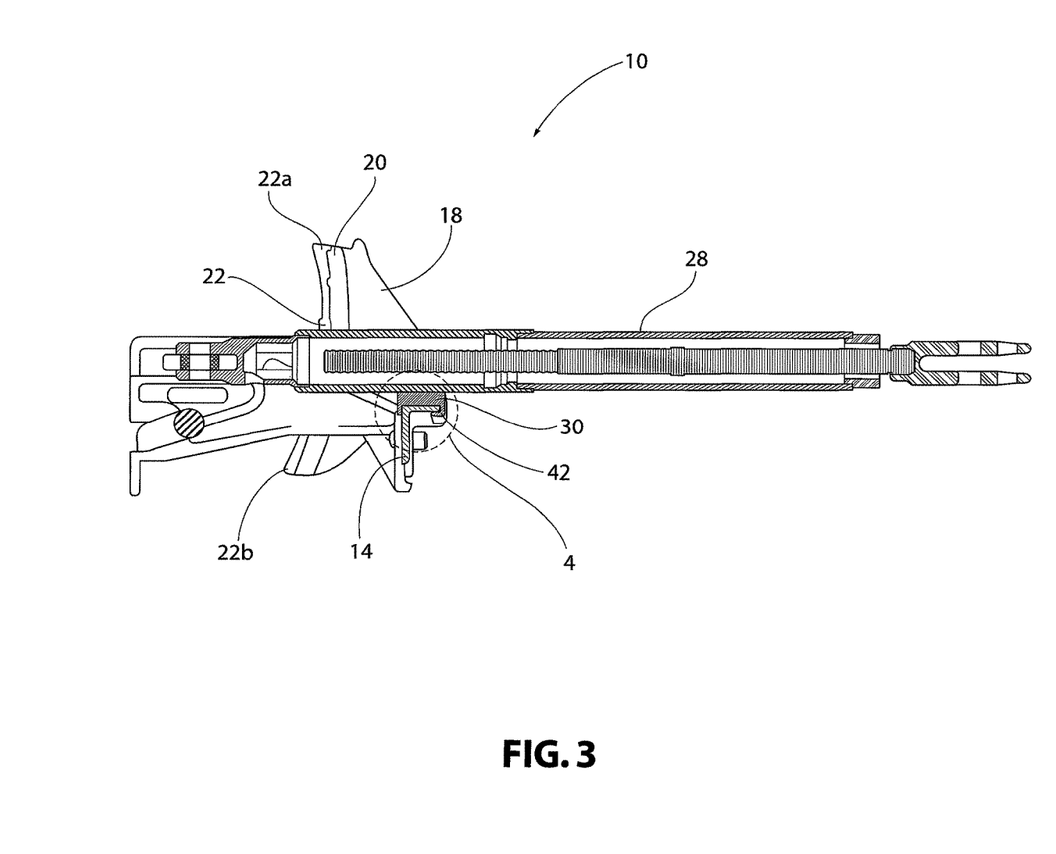
FIG. 3 is a cross-sectional view of the brake beam shown in FIG. 1 taken along line A-A of FIG. 1 in accordance with an embodiment of the present disclosure.

The compression beam 14 has a generally L-shaped cross section, as best shown in FIG. 3. A brake head 18 is provided at the opposing terminal ends of the compression beam 14 and/or the tension beam 16. Each brake head 18 includes a brake shoe carrier 20 adapted to receive a removable brake shoe 22. The brake mechanism 10 is coupled to the truck of the railway vehicle (not shown) at end portions 24 of the brake heads 18. In operation, the compression beam 14 and the tension beam 16 hang from the truck.

With continuing reference to FIG. 1 and with reference to FIG. 1A, the brake mechanism 10 further includes a pair of force transmitting levers 44, 46 pivotally connected by pins 48 to the strut member 26 of the respective brake beam 12, 13. The force transmitting members 44, 46 and interconnected by a rod 27 and a slack adjuster 28. As shown in FIG. 1, the rod 27 also connects a brake cylinder 29 to one end 44a of the force transmitting lever 44 for transferring the braking force exerted by the brake cylinder to the brake beam 12. The automatic slack adjuster 28 is attached to the opposing end 44b of the force transmitting lever 44 to automatically extend and move the brake heads 18 closer to the wheels of the railway vehicle in order to compensate for wear of the brake shoes 22.

As the components of the brake mechanism 10 wear toward their condemning limits, the compression beam 14 and the tension beam 16 tend to move relative to the wheels 60 and side frames 62 of the railway vehicle. This causes a misalignment of the compression beam 14 and the tension beam 16 relative to the side frames 62 and the wheels 60 and results in uneven contact between an upper portion 22a of the brake shoe 22 and the lower portion 22b of the brake shoe 22. In certain situations, the compression beam 14 may come into contact with the slack adjuster 28, which may result in wear on the compression beam 14 and/or the slack adjuster 28.

Figure 4:
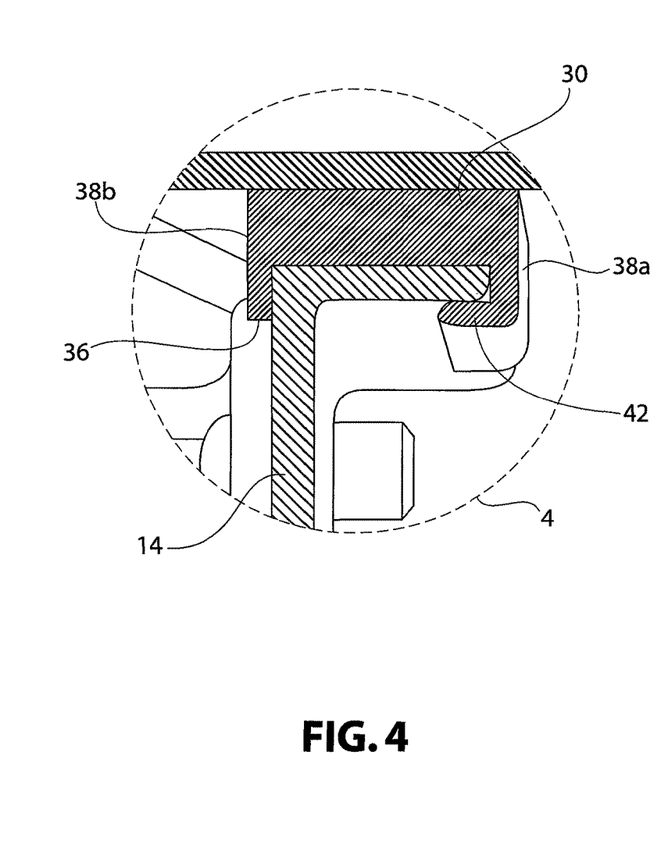
FIG. 4 is a detailed view of detailed portion "4" in FIG. 3 in accordance with an embodiment of the present disclosure.
Figure 5:
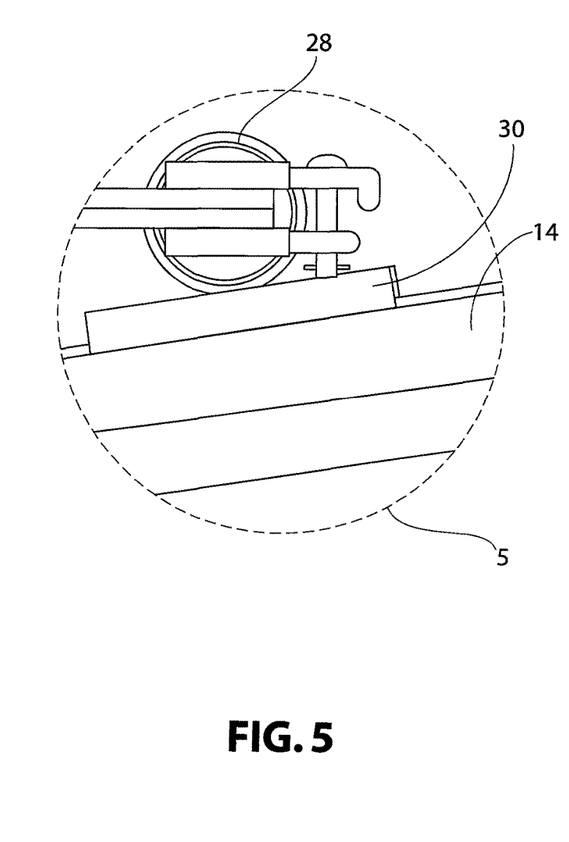
FIG. 5 is a detailed view of detailed portion "5" in FIG. 2 in accordance with an embodiment of the present disclosure.

With reference to FIGS. 2-3 and FIGS. 4-5, the brake mechanism 10 further includes a device 30 shown with portions 4 and 5 in FIGS. 3 and 2, respectively, for correcting uneven brake shoe wear (hereinafter referred to as "corrective device 30"). The corrective device 30 is adapted to compensate for any misalignment of the components of the brake mechanism 10 that may occur as the components reach their condemning limits. As best shown in FIG. 4, the corrective device 30 is adapted for connecting to at least a portion of the compression beam 14. In one embodiment, the corrective device 30 is adapted to wrap around at least a portion of the L-shaped profile of the compression beam 14. As shown in FIGS. 2-5, the corrective device 30 is desirably connected to the compression beam 14 proximate to the slack adjuster 28 such that the corrective device 30 is interposed between the compression beam 14 and the slack adjuster 28.

Figure 6:
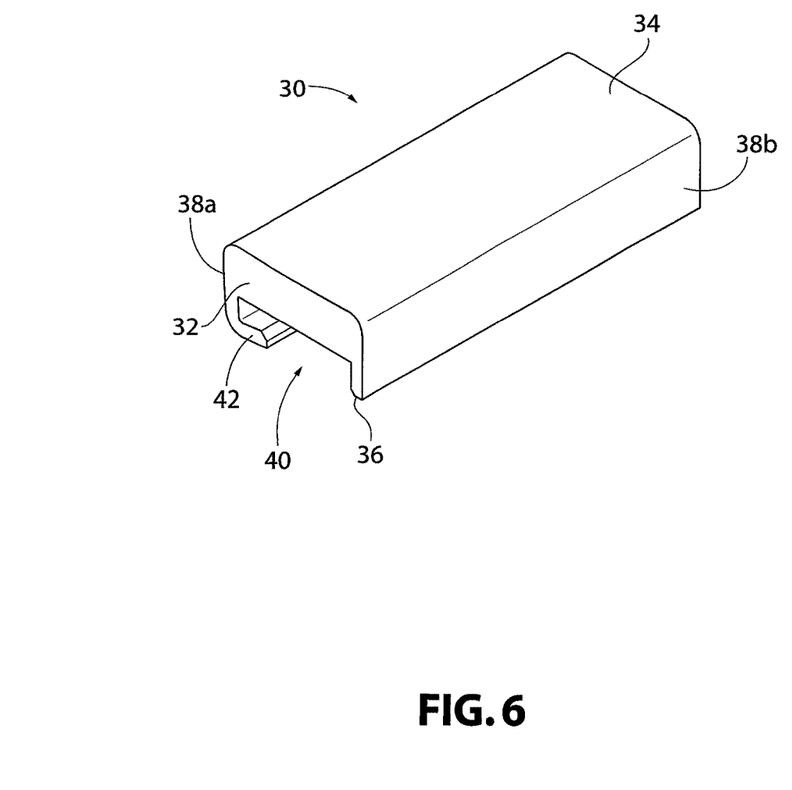
FIG. 6 is a perspective view of a corrective device for use with the brake beam illustrated in FIG. 1 in accordance with an embodiment of the present disclosure.
Figure 7:
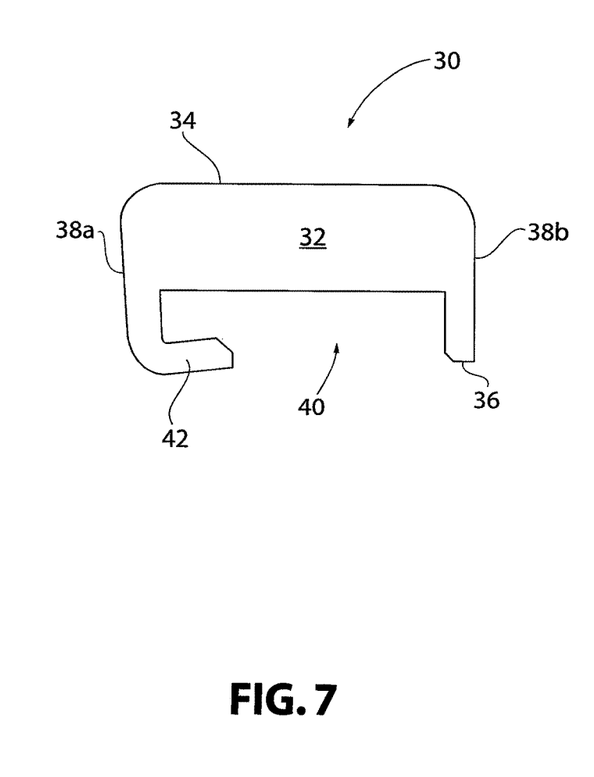
FIG. 7 is a side view of the corrective device shown in FIG. 6 in accordance with an embodiment of the present disclosure.

With reference to FIGS. 6-7, the corrective device 30 has a block-shaped structure with an elongated body 32. The elongated body 32 has an upper end 34 separated from a lower end 36 by a pair of sidewalls 38a and 38b. At least one recess 40 extends from the lower end 36 toward the upper end 34. The recess 40 is generally adapted to fit on at least a portion of the compression beam 14 (shown in FIGS. 1-5).

The recess 40 includes at least one securing element 42 adapted for securing the elongated body 32 on the compression beam 14. The securing element 42 extends from one sidewall 38a toward the opposing sidewall 38b over at least a portion of the width of the recess 40. The securing element 42 is desirably provided at a lower end of one sidewall 38a such that the width of the recess 40 in the region of the securing element 42 is substantially equal or smaller than the thickness of the sidewall of the compression beam 14. The securing element 42 may be angled inwards such that at least a portion of the securing element 42 is deflected outward as the corrective device 30 is connected to the compression beam 14. In one embodiment, the corrective device 30 is made from a flexible material, such as rubber or other elastomeric material. In other embodiments, the corrective device 30 is made from a rigid, self-lubricating material that is configured to deflect enough to secure it to the compression beam 14.

The corrective device 30 is adapted to compensate for any misalignment of the components of the brake mechanism 10 that may occur as the components reach their condemning limits. In particular, the corrective device 30 is adapted to stop the compression beam 14 and the tension beam 16 from rotating relative to the brake heads 18. Due to the position of the corrective device 30 between the compression beam 14 and the slack adjuster 28, movement of the compression beam 14 toward the slack adjuster 28 is prevented by the corrective device 30. The thickness of the corrective device 30 is dimensioned such that in case the compression beam 14 moves toward the slack adjuster 28, the movement of the compression beam 14 relative to the brake heads 18 and the wheels will be minimized, thereby reducing the potential for uneven brake shoe wear. Although described herein with reference to an exemplary embodiment of the brake mechanism 10, the corrective device 30 may be implemented with various other truck-mounted brake mechanisms not expressly disclosed herein.

While various embodiments of the device for correcting uneven brake shoe wear on truck-mounted brakes of a railway vehicle were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A corrective device for correcting uneven brake shoe wear on a brake mechanism for a railway vehicle, the railway vehicle including a brake beam having a tension beam coupled to a compression beam, a brake head with brake shoes provided at each end of the brake beam for cooperating with wheels of the railway vehicle, a force transmitting lever associated with the brake beam, the force transmitting lever having a brake cylinder connected to one end, and a slack adjuster connected to an opposing end of the force transmitting member, said corrective device including at least one elongated body having an upper end separated from a lower end by a pair of sidewalls;

at least one recess extending from the lower end toward the upper end of the at least one elongated body; and
at least one securing element adapted for securing the at least one elongated body on the compression beam of the brake beam,
wherein the corrective device is configured to be connected to the compression beam such that the slack adjuster rests directly upon and in contact with the corrective device, said corrective device being configured to cooperate with at least one of the compression beam and the slack adjuster to minimize or prevent the compression beam and the tension beam from rotating relative to the wheels of the railway vehicle, and
wherein the recess is sized to fit on at least a portion of the compression beam of the brake beam.

2. The corrective device of claim 1, wherein the corrective device is configured to cooperate with the compression beam to minimize or prevent movement of the compression beam toward the slack adjuster.

3. The corrective device of claim 2, wherein the corrective device is separate from the slack adjuster and is interposed between the compression beam and the slack adjuster.

4. The corrective device of claim 1, wherein the corrective device is formed from a flexible material.

5. The corrective device of claim 1, wherein the corrective device is formed from a rigid, self-lubricating material configured to deflect an amount sufficient enough to secure the corrective device to the compression beam.

6. The corrective device of claim 1, wherein the device is configured for use with a truck-mounted braking system.

7. The corrective device of claim 1, wherein the brake head includes an end portion configured to be coupled to a side frame of a truck of the railway vehicle and wherein the corrective device is configured to press down the compression beam and lift up an outside tip of the tension beam minimizing rotation of the compression beam and tension beam and reducing wear of the end portion of the brake head.

8. A corrective device for correcting uneven brake shoe wear on a brake mechanism for a railway vehicle, the railway vehicle including a brake beam having a tension beam coupled to a compression beam, a brake head with brake shoes provided at each end of the brake beam for cooperating with wheels of the railway vehicle, a force transmitting lever associated with the brake beam, the force transmitting lever having a brake cylinder connected to one end, and a slack adjuster connected to an opposing end of the force transmitting member,
said corrective device including at least one elongated body having an upper end separated from a lower end by a pair of sidewalls;
at least one recess extending from the lower end toward the upper end of the at least one elongated body; and
at least one securing element adapted for securing the at least one elongated body on the compression beam of the brake beam,
wherein the corrective device is configured to be connected to the compression beam such that the slack adjuster rests directly upon and in contact with the corrective device, said corrective device being configured to cooperate with at least one of the compression beam and the slack adjuster to minimize or prevent the compression beam and the tension beam from rotating relative to the wheels of the railway vehicle, and
wherein the at least one securing element extends from at least one of said pair of sidewalls, and wherein the securing element is angled inwards toward the at least one recess and deflects in an outward direction with respect to the at least one recess upon placement of the corrective device about the compression beam.

9. The corrective device of claim 8, wherein the at least one securing element extends from one sidewall toward an opposing sidewall over at least a portion of a width of the recess.

10. A braking system for a railway vehicle comprising:
a brake beam including a tension beam coupled to a compression beam;
a brake head with brake shoes provided at each end of the brake beam, the brake shoes configured for cooperating with wheels of the railway vehicle;
a force transmitting lever associated with the brake beam, the brake beam having a brake cylinder connected to one end;
a slack adjuster connected to an opposing end of the force transmitting member; and
a corrective device connected to the compression beam such that the slack adjuster rests directly upon and in contact with the corrective device, said corrective device being configured to cooperate with at least one of the compression beam and the slack adjuster to minimize or prevent the compression beam and the tension beam from rotating relative to the wheels of the railway vehicle,
wherein the corrective device comprises:
at least one elongated body having an upper end separated from a lower end by a pair of sidewalls;
at least one recess extending from the lower end toward the upper end of the at least one elongated body; and
at least one securing element adapted for securing the at least one elongated body on the compression beam of the brake beam, and
wherein the at least one securing element extends from at least one of said pair of sidewalls, and wherein the securing element is angled inwards toward the at least one recess and deflects in an outward direction with respect to the at least one recess upon placement of the corrective device about the compression beam.

11. The braking system of claim 10, including a pair of brake beams, each of said brake beams including a tension beam coupled to a compression beam, and wherein the slack adjuster interconnects the pair of brake beams.

12. The braking system of claim 11, wherein each of the pair of brake beams includes a corrective device in cooperation with the compression beam of each of the pair of brake beams.

13. The braking system of claim 10, wherein the corrective device, is configured to cooperate with the compression beam to minimize or prevent movement of the compression beam toward the slack adjuster.

14. The braking system of claim 10, wherein the braking system is configured to be mounted to a truck of a railway vehicle.

15. The braking system of claim 10, wherein the brake head includes an end portion configured to be coupled to a side frame of a truck of the railway vehicle and wherein the corrective device is configured to press down the compression beam and lift up an outside tip of the tension beam minimizing rotation of the compression beam and tension beam and reducing wear of the end portion of the brake head.

16. A method for correcting uneven brake shoe wear on a brake mechanism for a railway vehicle, the railway vehicle including a brake beam having a tension beam coupled to a compression beam, a brake head with brake shoes provided at each end of the brake beams, wherein the brake shoes are configured to cooperate with wheels on the railway vehicle during a braking operation, a force transmitting lever associated with the brake beam, the force transmitting member having a brake cylinder connected to one end, and a slack adjuster connected to an opposing end of the force transmitting member, and wherein the method includes providing a corrective device connected to the compression beam such that the slack adjuster rests directly upon and in contact with the corrective device, said corrective device being associated with at least one of the compression beam and the slack adjuster to minimize or prevent the compression beam and the tension beam from rotating relative to the wheels of the railway vehicle, wherein the corrective device comprises at least one elongated body having an upper end separated from a lower end by a pair of sidewalls;

at least one recess extending from the lower end toward the upper end of the at least one elongated body; and     at least one securing element adapted for securing the at least one elongated body on the compression beam of the brake beam, and wherein the method includes positioning the corrective device about the compression beam at a location between the compression beam and the slack adjuster, and wherein the at least one securing element extends from at least one of said pair of sidewalls, and wherein the securing element is angled inwards toward the at least one recess and deflects in an outward direction with respect to the at least one recess upon placement of the corrective device about the compression beam.

17. The method of claim 16, including providing the brake head with an end portion and coupling the end portion to a side frame of a truck of the railway vehicle and wherein the corrective device is configured to press down the compression beam and lift up an outside tip of the tension beam minimizing rotation of the compression beam and tension beam and reducing wear of the end portion of the brake head.

\* \* \* \* \*